US008922989B2

(12) United States Patent
Senatori et al.

(10) Patent No.: US 8,922,989 B2
(45) Date of Patent: Dec. 30, 2014

(54) INPUT/OUTPUT PORT SYSTEMS AND METHODS

(75) Inventors: Mark David Senatori, The Woodlands, TX (US); Peter M. On, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 184 days.

(21) Appl. No.: 13/805,383

(22) PCT Filed: Jun. 23, 2010

(86) PCT No.: PCT/US2010/039632
§ 371 (c)(1),
(2), (4) Date: Dec. 19, 2012

(87) PCT Pub. No.: WO2011/162754
PCT Pub. Date: Dec. 29, 2011

(65) Prior Publication Data
US 2013/0094133 A1 Apr. 18, 2013

(51) Int. Cl.
*G06F 1/16* (2006.01)
(52) U.S. Cl.
CPC ............ *G06F 1/16* (2013.01); *G06F 1/1684* (2013.01)
USPC .................. 361/679.4; 235/462.45; 455/410; 345/204
(58) Field of Classification Search
CPC ...................................................... G06F 1/16
USPC ......... 345/173, 163, 179, 108, 157, 600, 169, 345/589, 441, 660, 204, 212; 312/223.1, 312/223.2, 223.3, 223.4, 265.6; 455/557, 455/90.1, 566, 556.1, 423, 422.1, 410, 455/569.2, 444; 361/679.45, 679.4, 679.6, 361/679.27, 679.21, 679.12, 679.56, 361/679.41, 679.08, 679.06, 679.02; 235/492, 145 R, 462.25, 440, 462.45, 235/462.01
See application file for complete search history.

(56) References Cited

U.S. PATENT DOCUMENTS 5,111,361 A  5/1992  Kobayashi
5,297,003 A  3/1994  Nomura et al.
(Continued)

FOREIGN PATENT DOCUMENTS

JP  8227335 A  9/1996
JP  2000/029566 A  1/2000
KR  10-2004-0034192 A  4/2004

OTHER PUBLICATIONS

International Search Report and Written Opinion received in PCT Application No. PCT/US2010/039632, mailed on Mar. 30, 2011, 9 pages.

*Primary Examiner* — Hung Duong

(57) ABSTRACT

Input/output ("I/O") port systems and methods are provided. An I/O port system can include a housing having at least one exterior surface and a cover member. The cover member can obstruct at least a portion of an input/output port on the housing and not extend beyond the exterior surface of the housing when in a first cover position. The cover member can expose the I/O port and extend beyond the exterior surface of the housing, when translated away from the first cover position. The system can further include a support member operably connected to the cover member and the housing. When the cover member is disposed in the first cover position, the support member can be maintained in a first position proximate the housing. When the cover member is translated away from the first cover position, the support member can translate to a second support position extending from the housing.

17 Claims, 3 Drawing Sheets

(56) References Cited

U.S. PATENT DOCUMENTS

| | | |
|---|---|---|
| 5,754,397 A | 5/1998 | Howell et al. |
| 5,918,957 A | 7/1999 | Bovia et al. |
| 5,991,838 A * | 11/1999 | Swindler et al. ............. 710/303 |
| 6,002,581 A | 12/1999 | Lindsey |
| 6,053,589 A | 4/2000 | Lin |
| 6,097,595 A | 8/2000 | Cipolla |
| 8,311,515 B1 * | 11/2012 | Smith et al. .................. 455/410 |
| 2005/0068756 A1 | 3/2005 | Tsuji et al. |
| 2013/0174401 A1 * | 7/2013 | Brogan et al. ................. 29/428 |

* cited by examiner

INPUT/OUTPUT PORT SYSTEMS AND METHODS

BACKGROUND OF THE INVENTION

Description of the Related Art

Increasing consumer demand for smaller, lighter, and thinner electronic devices has forced designers to package ever more powerful and ever more capable electronic devices in increasingly smaller enclosures. Frequently, to maintain an absolute minimum enclosure size, non-essential portions of the electronic device will be provided as external peripheral devices rather than as built in devices. These peripheral devices must be couplable to the electronic device using interfaces or ports disposed about the exterior surface of the electronic device housing. At times, the reduced size of the housing can impede access to the peripheral device interface. At other times, the physical size of the interface itself may be larger than the size of the electronic device housing, accommodating such interfaces can present a significant challenge to designers.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
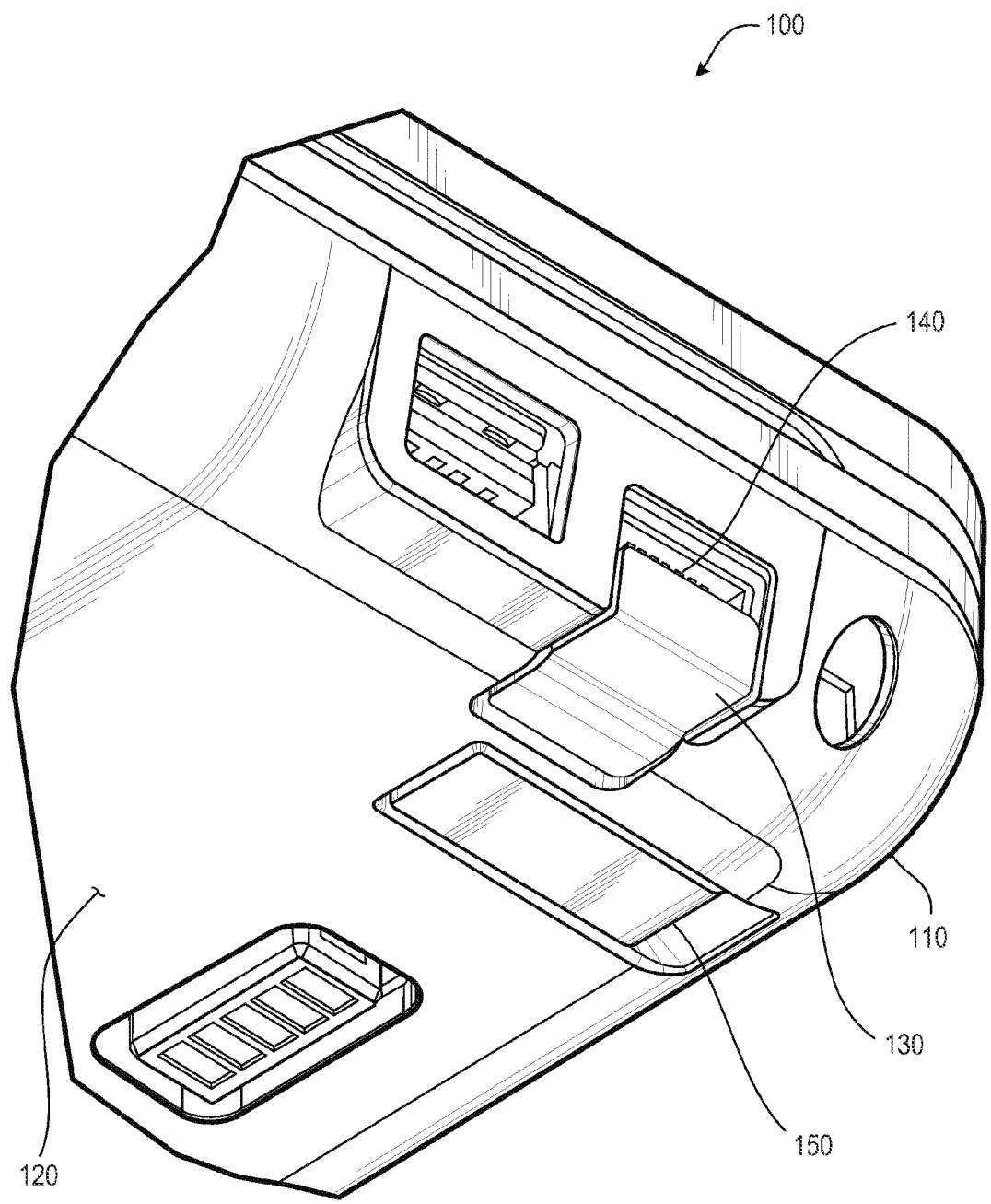
FIG. 1 is a partial, lower perspective view depicting an illustrative input/output ("I/O") port in a first support position, according to one or more embodiments described herein.

Portable electronic devices continue to shrink in physical size and increase in capability. In order to respond to public demand to shrink the size of these devices, designers have moved many input/output devices from the housing, instead providing the I/O devices as peripheral devices capable of coupling to the electronic device via one or more interfaces disposed on an exterior surface of the housing. Frequently the exposed nature of these I/O interfaces leaves them vulnerable to damage or fouling with debris. To protect these exposed interfaces, doors or other removable coverings may be provided, however these doors and removable coverings can, where attached to the electronic device, interfere with the operation of the I/O interface and the use of the electronic device.

An illustrative input/output ("I/O") port system is provided. An I/O port system can include a housing having at least one exterior surface and a cover member. The cover member can obstruct at least a portion of an I/O port on the housing and not extend beyond the exterior surface of the housing when in a first cover position. The cover member can expose the I/O port and extend beyond the exterior surface of the housing, when translated away from the first cover position. The system can further include a support member operably connected to the cover member and the housing. When the cover member is disposed in the first cover position, the support member can be maintained in a first support position proximate the housing. When the cover member is translated away from the first cover position, the support member can translate to a second support position extending from the housing.

An illustrative I/O port method is provided. The method can include attaching a cover member proximate an input/output ("I/O") port disposed on or about an electronic device housing. In a first cover position the cover member can obstruct access to at least a portion of the I/O port, and when in a second cover position, the cover member can provide access to the I/O port. The method can also include operably connecting the cover member to at least one support member hingedly attached to the electronic device housing. The method can include transitioning the support member from a first support position proximate the electronic device housing to a second support position extending from the electronic device housing concurrent with the displacement of the cover member from the first cover position.

Another illustrative input/output ("I/O") port system is provided. The system can include an electronic device disposed within a housing and an I/O port coupled to the electronic device and disposed on an exterior surface of the housing. A cover member, hingedly attached to the housing, can be disposed proximate the I/O port. When the cover member is disposed in a first cover position, the cover member obstructs at least a portion of the I/O port. When displaced from the first cover position, the cover member can at least partially expose the I/O port. The system can include a support member operably connected to the cover member and the housing disposed on the exterior surface of the housing. The support member can be maintained in a first support position proximate the housing when the cover member is disposed in the first cover position. The support member can be biased away from the first position to a second support position using a tension member. When in the second support position, the support member can extend from the housing a distance sufficient to clear the cover member when the cover member is displaced from the first cover position.

FIG. 1 is a partial, lower perspective view depicting an illustrative input/output ("I/O") port system 100 in a first cover position, according to one or more embodiments. The system 100 can include a housing 110 having at least one exterior surface 120, a cover member 130, an input/output ("I/O") port 140, and a support member 150.

The cover member 130 can be operably connected to the support member 150 such that the displacement of the cover member 130 from a first cover position, for example the "closed" position depicted in FIG. 1, results in the extension or deployment of the support member 150 from the exterior surface 120 of the housing 110. The deployment of the support member 150 can provide sufficient clearance between the exterior surface 120 of the housing 110 and a surface upon which the housing 110 is placed to permit the cover member 130 to partially or completely expose the I/O port 140.

As used herein, an "operable connection", or a connection by which entities are "operably connected", is one in which the entities are connected in a manner whereby the one entity is in some way connected to a second entity. An operable connection can be directly between the first and the second entities, for example through the use of threaded fasteners, nails, chemical adhesives, pins, rivets, or the like. An operable connection can link the first and the second entities using one or more intermediate entities, in the instant example, the cover member 130 and the support member 150 can be linked using one or more intermediate members such as push rods, connectors, linkages, or the like.

The housing 110 can have one or more exterior surfaces 120. In some embodiments, the housing 110 can include one or more portions of a multipart enclosure disposed partially or wholly about one or more electronic devices. For example, in some embodiments, the housing 110 can include, but is not limited to, a two-piece "clamshell" type enclosure disposed about a laptop, netbook or similar portable computing device. In some embodiments, the housing can be a "low profile" or reduced height housing. The housing 110, can include, but is not limited to a housing disposed partially or completely about a laptop computer, a portable computer, a netbook computer, a tablet computer, a cellular device, a handheld gaming system, or an ultraportable computer.

The cover member 130 can be a single or multipiece member operably connected to the housing 110 in a location proximate one or more input/output ("I/O") ports 140. For example, the cover member 130 can be connected to the housing 110 via one or more hinges, thereby permitting the cover member 130 to pivot about the one or more hinges. The cover member 130 can be disposed such that when the cover member 130 is disposed in a first, e.g. a closed, cover position as depicted in FIG. 1, at least a portion of the cover member 130 interferes with the coupling of a peripheral device to the I/O port 140. In some embodiments, one or more stays, catches, latches, or similar devices can be used to maintain the cover member 130 in the first position. In at least some embodiments, one or more friction devices can be used to maintain the cover member 130 in the first cover position. The I/O port 140 can include at least one interface adapted for communicative coupling with at least one peripheral device. The I/O port can be an Ethernet port, an external Serial ATA port, a Universal Serial Bus ("USB") port, a Video Graphic Array ("VGA") port, a Digital Video Interface ("DVI") port, a High Definition Media Interface ("HDMI") port, and an IEEE 1394 ("Firewire") port.

When the cover member 130 is disposed in the first cover position, an operable connection linking the cover member 130 to the support member 150 can be used to maintain the support member 150 in a first support position, for example a position proximate the exterior surface 120 of the housing 110. In some embodiments, the operable connection between the cover member 130 and the support member 150 can be direct, for example by disposing a surface feature, e.g., a raised protrusion, on the cover member 130 and a complimentary surface feature, e.g., a detent complimentary to the raised protrusion, on the support member 150.

In some embodiments, the operable connection between the cover member 130 can include one or more intermediate members, for example an intermediate member coupled to the cover member hinge such that rotation of the cover member about the hinge provides a linear, an angular, or a combined linear and angular displacement of the intermediate member. In at least some embodiments, the intermediate member can maintain the support member 150 in the first support position when the cover member 130 is in the first cover position. In at least some embodiments, the displacement of the intermediate member resulting from the displacement of the cover member 130 from the first cover position can cause the displacement of the support member 150 from the first support position.

The support member 150 can include any single or multipiece member adapted to provide clearance between the housing 110 and an underlying surface. In some embodiments, the clearance provided by the support member 150 when in the second support position can be equal to or greater than the height of the displaced cover member 130, thereby permitting a user to displace the cover member 130 and access the I/O port 140 when the housing is placed upon an underlying surface. The support member 150 can be operably connected to the housing 110 using one or more hinges. In some embodiments, a plurality of support members 150 can be disposed on or about the housing 110. Where a plurality of support members 150 are provided, all or a portion of the plurality of support members 150 can be operably connected using one or more connecting members, for example a common hinge. In some embodiments, all or a portion of the support member 150 can be disposed within a recess formed in the exterior surface 120 of the housing 110.

The support member 150 can be biased from the first support position using a spring or similar tension member. For example, when a tension member is operably connected to the support member 150 and the cover member 130 is displaced from the first position by a user, the tension member can displace the support member 150 from the first support position into a second support position, for example a position extending from the housing 110. Where a plurality of support members 150 are used, one or more tension members can be used to simultaneously displace all or a portion of the support members 150 from the first support position to the second support position.

Figure 2:
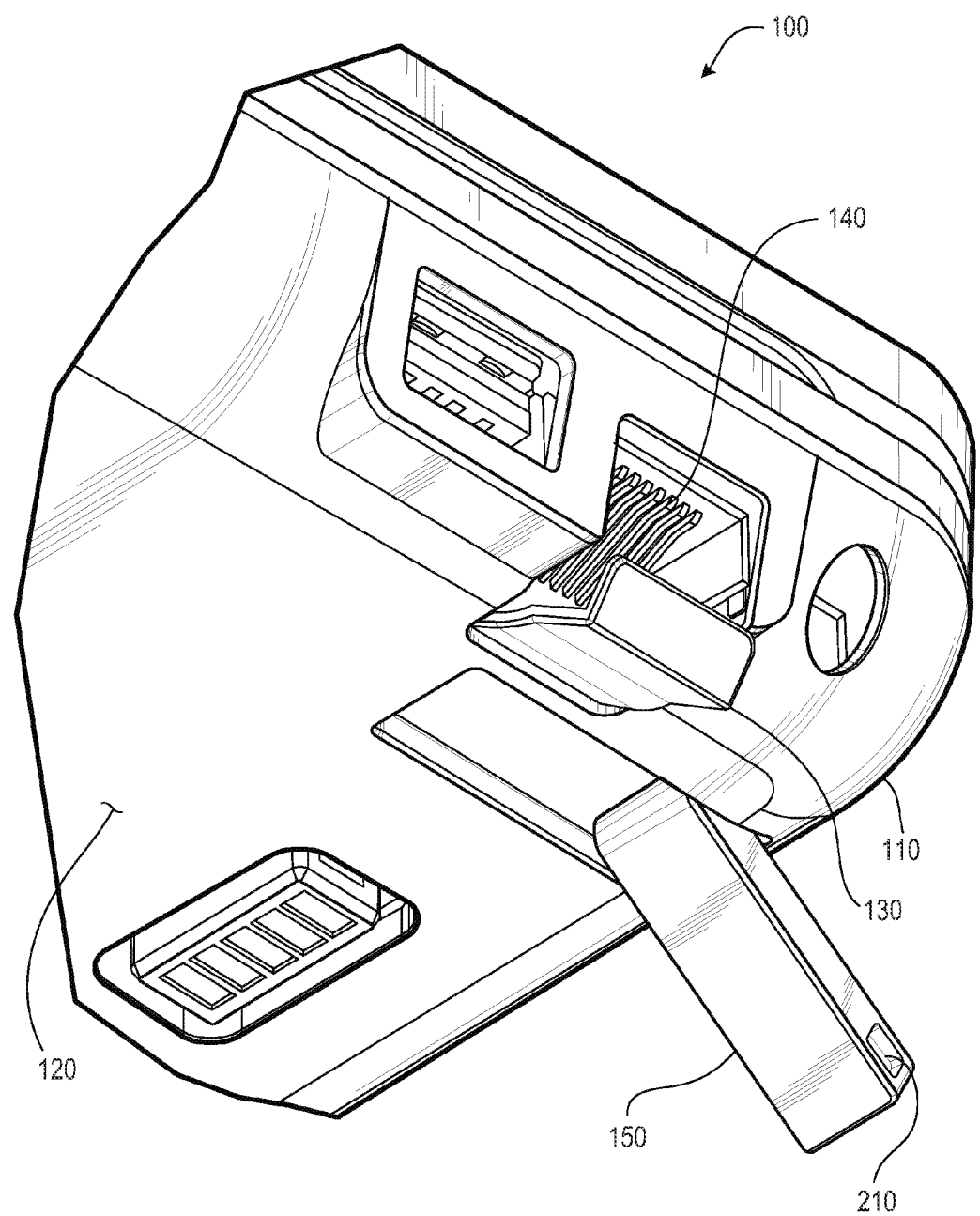
FIG. 2 is a partial, lower perspective view depicting an illustrative input/output ("I/O") port in a second support position, according to one or more embodiments described herein.

FIG. 2 is a partial, lower perspective view depicting the illustrative electronic device input/output port depicted in FIG. 1 in a second support position, according to one or more embodiments. In some embodiments, the cover member 130 can be displaced from the first cover position. As the cover member 130 is displaced from the first cover position, the support member 150 can be displaced from the first support position proximate the housing 110 to a second support position extending from the housing 110 as depicted in FIG. 2. Such an arrangement can permit the setting of the housing 110 on a surface, with the support member 150 providing sufficient clearance for the displacement of the cover member 130 from the first cover position. Once displaced from the first cover position, the I/O port 140 can be partially or completely exposed, thereby permitting a user to couple a peripheral device to the I/O port 140.

In some embodiments, a detent 210 can be disposed in, on, or about the support member 150. In at least some embodiments, the support member can have a first end and a second end. The first end of the support member 150 can be hingedly attached to the housing 110. The second end of the support member 150 can include at least one detent 210. In at least some embodiments, the detent 210 can be operably connected, directly or through the use of one or more intermediate members to the cover member 130.

The detent 210 can be operably, directly or indirectly, connected to the cover member 130 such that a displacement of the cover member 130 from the first cover position proximate the I/O port 140 releases the support member 150. Where one or more tension members are operably connected to the support member 150, when the detent is released, the tension member can bias the support member 150 to the second support position extending from the housing 110.

Where a plurality of support members 150 are employed, all or a portion may have a similar detent 210. In such an embodiment, the displacement of the cover member 130 from the first cover position can cause the displacement of one or more intermediate members linking the cover member 130 to all or a portion of the plurality of support members 150. The displacement of the intermediate members can, in turn, cause the displacement of all or a portion of the support members 150 from the first support position to the second support position.

In some embodiments, one or more alignment features can be disposed in, on, or about the cover member 130 to facilitate the coupling of one or more peripheral devices to the I/O port 140. Such alignment features can include one or more raised surface features, one or more recessed surface features, or any combination of raised and recessed surface features disposed partially or wholly, in, on, or about the cover member 130. The one or more alignment features can be partially or completely exposed when the cover member 130 is displaced from the first cover position.

Figure 3:
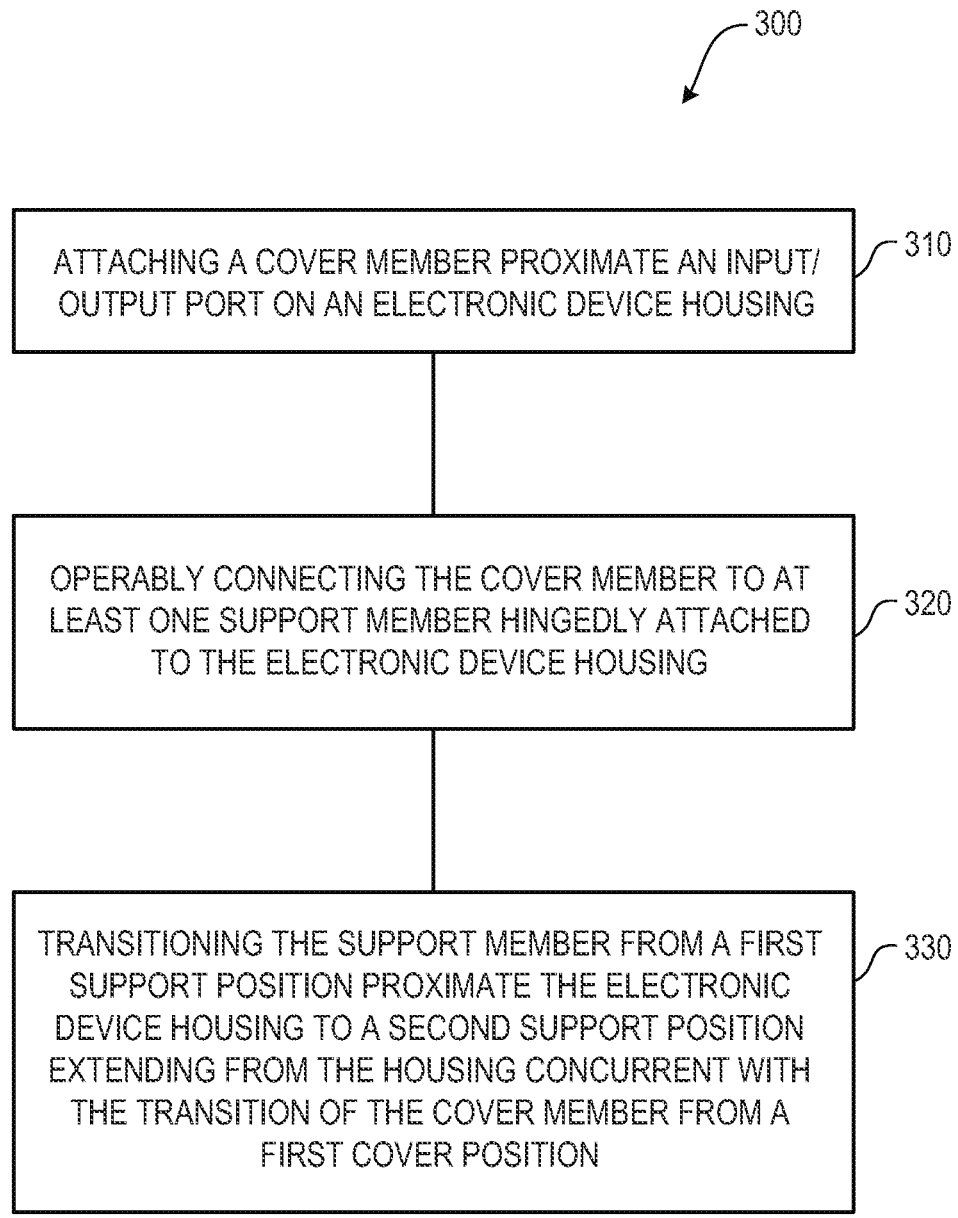
FIG. 3 is a flow diagram depicting an illustrative input/output ("I/O") port method, according to one or more embodiments described herein.

FIG. 3 is a flow diagram depicting an illustrative input/output ("I/O") port method 300, according to one or more embodiments. The method can include attaching a cover member 130 proximate an I/O port 140 on an electronic device housing 110 at 310. The cover member 130 can be disposed in at least two cover positions, in a first cover position the cover member 130 can partially or completely obstruct a user's access to the I/O port 140 disposed proximate the cover member 130. In a second cover position, the cover member 130 can provide a user with access to the I/O port 140 disposed proximate the cover member 130. In at least some embodiments, one or more alignment features can be disposed in, on, or about the cover member 130 to properly align the coupling of a peripheral device to the I/O port 140.

The method 300 can further include operably connecting the cover member 130 to at least one support member 150 hingedly attached to the electronic device housing 110 at 320. In some embodiments, the operable connection can include a direct operable connection between the cover member 130 and the support member 150, for example a protruding surface feature on the cover member 130 can fit within a detent 210 disposed in, on, or about the support member 150. In other embodiments, the operable connection can include one or more intermediate members linking the cover member 130 to the support member 150, for example one or more intermediate members can be operably connected to the cover member 130 such that a displacement of the cover member 130 from the first cover position (depicted in FIG. 1) causes a displacement of the intermediate member. The intermediate member can, in some embodiments fit within a detent 210 disposed in, on, or about the support member 150. The displacement of the intermediate member can withdraw the member from the detent 210.

The method 300 can also include transitioning the support member 150 from a first support position proximate the electronic device housing 110 (such as depicted in FIG. 1) to a second support position extending from the housing 110 (such as depicted in FIG. 2). The transitioning of the support member 150 from the first to the second support position can be concurrent with the displacement of the cover member 130 from the first cover position.

A user can restore the support member 150 from the second support position to the first support position by transitioning the support member 150 from the second support position (extended from the housing 110) to the first support position (proximate the housing 110) while simultaneously displacing the cover member 130 to the first cover position.

While the foregoing is directed to embodiments of the present invention, other and further embodiments of the invention may be devised without departing from the basic scope thereof, and the scope thereof is determined by the claims that follow.

We claim the following:

1. An I/O port system, comprising:
  a housing comprising at least one exterior surface;
  a cover member;
  wherein the cover member obstructs at least a portion of an input/output port on the device housing and does not extend beyond the exterior surface of the housing when in a first cover position; and
  wherein the cover member exposes the I/O port and extends beyond the exterior surface of the housing, when displaced from the first cover position; and
  a support member operably connected to the cover member and the housing;
  wherein, when the cover member is disposed in the first cover position, the support member is maintained in a first position proximate the housing; and
  wherein, when the cover member is displaced from the first cover position, the support member translates to a second support position extending from the housing.

2. The system of claim 1, further comprising an electronic device coupled to the I/O port.

3. The system of claim 2, wherein the support member comprises a member having a first end and a second end,
  wherein the first end is hingedly attached to the housing; and
  wherein the second end comprises a detent operably connected to the cover member.

4. The system of claim 1, further comprising at least one tension member biasing the support member away from the first support position.

5. The system of claim 1, wherein the housing comprises an electronic device housing disposed at least partially about an electronic device selected from the group of devices consisting of: a laptop computer, a portable computer, a netbook computer, a tablet computer, a cellular device, a handheld gaming system, and an ultraportable computer.

6. The system of claim 1, wherein the I/O port is selected from the group of I/O ports consisting of: an Ethernet port, an external Serial ATA port, a Universal Serial Bus ("USB") port, a Video Graphic Array ("VGA") port, a Digital Video Interface ("DVI") port, a High Definition Media Interface ("HDMI") port, and an IEEE 1394 ("Firewire") port.

7. The system of claim 1, wherein, the support member is at least partially disposed within a complimentary recess disposed on the surface of the housing when in the first support position.

8. The system of claim 1, wherein the operable connection between the support member and the housing comprises a hinge comprising a pin and a tension member biasing the support member from the first support position.

9. An I/O port method, comprising:
  attaching a cover member proximate an input/output ("I/O") port on or about an electronic device housing,
    wherein when in a first cover position the cover member obstructs access to at least a portion of the I/O port; and
    wherein when in a second cover position, the cover member provides access to the I/O port;
  operably connecting the cover member to at least one support member hingedly attached to the electronic device housing; and
  transitioning the support member from a first support position proximate the electronic device housing to a second support position extending from the electronic device housing concurrent with the displacement of the cover member from the first cover position.

10. The method of claim 9, further comprising coupling an electronic device to the I/O port.

11. The method of claim 9, wherein the I/O port is selected from the group of I/O ports consisting of: an Ethernet port, an external Serial ATA port, a Universal Serial Bus ("USB") port, a Video Graphic Array ("VGA") port, a Digital Video Interface ("DVI") port, a High Definition Media Interface ("HDM1") port, and an IEEE 1394 ("Firewire") port.

12. The method of claim 9, wherein the operable connection between the cover member and the support member comprises a detent disposed on or about the support member.

13. The method of claim 9, wherein the operable connection between the support member and the housing comprises a hinge comprising a pin and a tension member biasing the support member from the first position.

14. An input/output ("I/O") port system, comprising:
   an electronic device disposed within a housing;
   an I/O port coupled to the electronic device and disposed on an exterior surface of the housing;
   a cover member disposed proximate the I/O port;
      wherein the cover member is hingedly attached to the housing;
      wherein when the cover member is disposed in a first cover position, the cover member obstructs at least a portion of the I/O port;
      wherein the cover member can be displaced from the first cover position to at least partially expose the I/O port; and
      wherein the cover member provides an alignment feature when displaced from the first cover position; and
   a support member disposed on the exterior surface of the housing and operably connected to the cover member and the housing;
      wherein the support member is maintained in a first support position proximate the housing when the cover member is disposed in the first cover position;
      wherein the support member is biased away from the first position to a second support position using a tension member; and
      wherein the support member, when in the second support position, extends from the housing a distance sufficient to raise the housing a distance equal to or greater than the displaced cover member.

15. The system of claim 14, wherein the I/O port is selected from the group of I/O ports consisting of: an Ethernet port, an external Serial ATA port, a Universal Serial Bus ("USB") port, a Video Graphic Array ("VGA") port, a Digital Video Interface ("DVI") port, a High Definition Media Interface ("HDMI") port, and an IEEE 1394 ("Firewire") port.

16. The system of claim 14, wherein, the support member is at least partially disposed within a complimentary recess disposed on the surface of the housing when disposed in the first support position.

17. The system of claim 14, wherein the operable connection between the support member and the housing comprises a hinge comprising a pin and a tension member biasing the support member from the first position.

* * * * *

UNITED STATES PATENT AND TRADEMARK OFFICE
CERTIFICATE OF CORRECTION

PATENT NO. : 8,922,989 B2
APPLICATION NO. : 13/805383
DATED : December 30, 2014
INVENTOR(S) : Mark David Senatori et al.

It is certified that error appears in the above-identified patent and that said Letters Patent is hereby corrected as shown below:

In the Claims

In column 7, line 4, in Claim 11, delete "("HDM1")" and insert -- ("HDMI") --, therefor.

Signed and Sealed this
Twenty-first Day of April, 2015

Michelle K. Lee
*Director of the United States Patent and Trademark Office*